United States Patent [19]

Duffy et al.

[11] Patent Number: 4,624,442
[45] Date of Patent: Nov. 25, 1986

[54] CONTROL REGULATOR HAVING A ROLLING DIAPHRAGM

[76] Inventors: John W. Duffy, 1512 McClellan St., Tama, Iowa 52339; William J. Bonzer, R.R. #3-Box 243; Gary L. Scott, 4 Columbus Dr., both of Marshalltown, Iowa 50158; Dennis G. Sickels, 2204 S. 5th Ave.; Ralph W. Zeigler, 607 N. 16th St., both of Marshalltown, Iowa 50158

[21] Appl. No.: 694,176

[22] Filed: Jan. 23, 1985

[51] Int. Cl.$^4$ .................................. F16K 31/126
[52] U.S. Cl. ........................... 251/61.1; 137/556; 137/625.28; 251/45; 251/46; 251/331
[58] Field of Search ............... 251/45, 46, 61.1, 331; 92/43, 44, 98 R; 137/625.28, 556

[56] References Cited

U.S. PATENT DOCUMENTS

| | | | |
|---|---|---|---|
| 2,388,988 | 11/1945 | Mueser | 251/24 |
| 2,537,308 | 1/1951 | Hansen | 137/157 |
| 2,562,315 | 7/1951 | Kempton | 137/139 |
| 2,572,175 | 10/1951 | McPherson | 137/139 |
| 2,705,608 | 4/1955 | Phillips | 251/30 |
| 2,886,281 | 5/1959 | Canalizo | 251/57 |
| 2,940,722 | 6/1960 | Vargo | 251/30 |
| 2,990,252 | 6/1961 | Geldern | 23/252 |
| 3,078,066 | 2/1963 | Moore | 251/61 |
| 3,415,275 | 12/1968 | Berggren | 137/556 |
| 3,451,423 | 6/1969 | Priese | 137/556 |
| 3,468,511 | 9/1969 | Haskins | 251/61.1 |
| 3,502,297 | 3/1970 | Wardrup | 251/25 |
| 3,690,344 | 9/1972 | Brumm | 137/625.28 |
| 3,719,343 | 3/1973 | Werra | 251/61.1 |
| 3,792,720 | 2/1974 | Robbins | 137/625.28 |
| 3,802,462 | 4/1974 | Trosch | 137/556 |
| 3,978,878 | 9/1976 | Rudolph | 137/102 |
| 4,181,151 | 1/1980 | Ensign | 137/625.28 |
| 4,198,029 | 4/1980 | Johnson | 251/61.1 |
| 4,207,914 | 6/1980 | Holloway | 137/85 |
| 4,232,851 | 11/1980 | Johnson | 251/61.1 |
| 4,359,098 | 11/1982 | Johnson | 169/90 |
| 4,376,315 | 3/1983 | Badger | 4/431 |

OTHER PUBLICATIONS

Reference: Reg-U-Liner Control Valve General Bulletin, Sprague Meter Division of Textron Inc., 5/79.

Primary Examiner—Samuel Scott
Assistant Examiner—Allen J. Flanigan
Attorney, Agent, or Firm—Dale A. Kubly; Nicholas A. Camasto

[57] ABSTRACT

A rolling diaphragm regulator valve is affixed in a globe type valve body and includes a non-stretchable fabric reinforced liner for covering and uncovering, by rolling action in response to changes in pressure in a control chamber, a plurality of slots in a baffle positioned between the valve body inlet and outlet. An axially movable spring-biased nose cone, mounted behind the diaphragm, provides a surface over which the diaphragm is draped for controlling substantially all movement of the diaphragm. A travel indicator is operable by movement of the nose cone to provide a visual indication of the position of the valve.

9 Claims, 3 Drawing Figures

CONTROL REGULATOR HAVING A ROLLING DIAPHRAGM

FIELD OF THE INVENTION

This invention relates generally to flow control regulators or throttling valves and specifically to such valves that incorporate a rolling diaphragm.

BACKGROUND OF THE INVENTION AND PRIOR ART

Control regulators or throttling valves of the type that incorporate deformable elastomeric diaphragms or liners that operate by pressure differentials on their two sides to variably uncover a plurality of orifices, e.g., slots, in a baffle positioned between an upstream inlet and a downstream outlet in a flowpath are well known in the art. The operating pressure is referred to as a pilot pressure and is changeable to control the operating position of the liner. Such valves may, for example, be used for controlling the flow of a variety of fluids and gases and, because of their throttling nature, often operate in a partially open position with a substantial differential between the upstream and downstream pressures. While such valves have, in general, rendered satisfactory service, they are not without problems. In gas applications in particular, the flow velocity may create icing conditions on the diaphragm and give rise to problems in shut-off.

The flexible liners are also subject to stretching. Under certain operating conditions the diaphragms may be "pinched" or folded over upon themselves which is detrimental to the life of the liner and proper functioning of the valve.

The baffle generally comprises a frustroconical shaped grill containing slot shaped apertures that are progressively covered and uncovered by the diaphragm as it is "rolled" into contact therewith. The portion of the slots that are uncovered by the diaphragm determines the flow rate through the baffle. Difficulties in some designs have resulted from uneven rolling of the diaphragm. A backup "nose piece" is often included to provide a stationary surface against which the diaphragm may rest to assist in controlling its movement during unrolling to minimize the above mentioned pinching and foldover. The slot configuration for the grill holes is very common, although circular or other shaped holes may also be used.

Another problem encountered with the rolling diaphragm is the tendency of the liner to be extruded into the slots of the frustroconical grill by action of the operating pilot pressure against the diaphragm when the valve is closed or partially closed. A notable deficiency is the lack of any readily available means for indicating the amount that the valve is open for flow. Also, the valves are generally cylindrically shaped and designed to be clamped in the pipeline by suitable flanges and bolting. This has rendered servicing of the valve inconvenient in many installations.

OBJECTS OF THE INVENTION

A principal object of the invention is to provide a novel rolling diaphragm regulator valve.

Another object of the invention is to provide a rolling diaphragm regulator valve with means for indicating the operating condition of the valve.

A further object of the invention is to provide a rolling diaphragm regulator valve that is readily serviceable.

A still further object of the invention is to provide a rolling diaphragm regulator valve that is reliable in operation.

Still another object of the invention is to provide a rolling diaphragm regulator valve that minimizes extrusion of the diaphragm.

An additional object of the invention is to provide a rolling diaphragm regulator valve that eliminates pinching or fold-over of the diaphragm.

SUMMARY OF THE INVENTION

In accordance with the invention, there is provided a rolling diaphragm regulator valve including a frustroconical baffle defining a plurality of apertures interposed between an upstream inlet and a downstream outlet, and an elastomeric diaphragm arranged for rolling and unrolling to progressively expose and cover the apertures in response to pilot pressure in a control chamber, wherein a movable nose cone is positioned behind the diaphragm in communication with the control chamber for controlling movements of the diaphragm.

The invention further contemplates a substantially non-stretchable diaphragm that has an arc length equal to the path along the surface of the baffle to eliminate the tendency of the diaphragm to pinch or fold over. The diaphragm is fabric-reinforced to minimize extrusion into the apertures of the baffle.

The invention also includes means operable in response to movement of the movable nose to indicate the amount that the valve is open to flow.

BRIEF DESCRIPTION OF THE DRAWINGS

These and other objects of the invention will be apparent upon reading the following description in conjunction with the drawings in which.

DESCRIPTION OF THE PREFERRED EMBODIMENT

Figure 1:
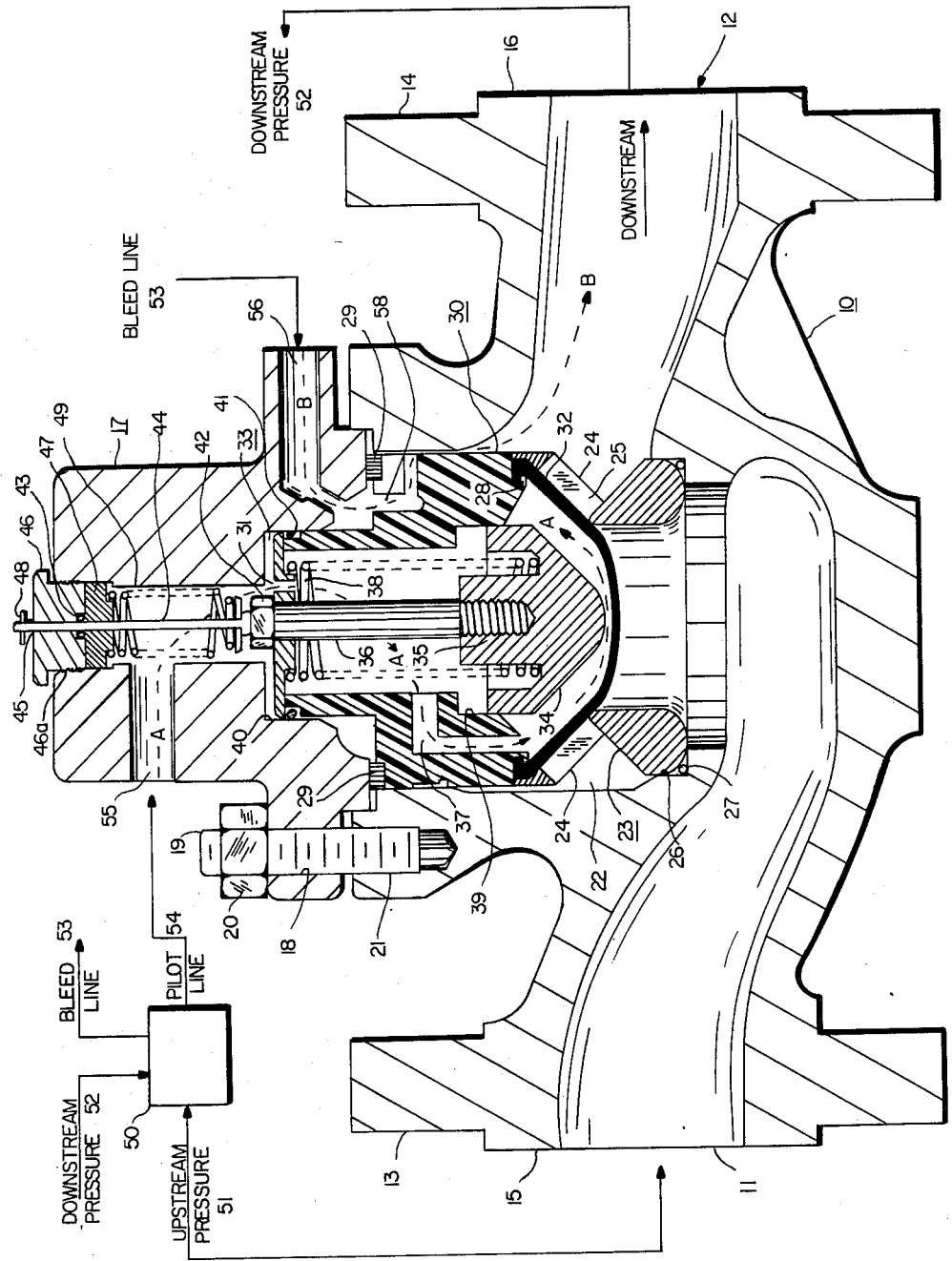
FIG. 1 is a cross section of a globe valve body incorporating the rolling diaphragm control regulator valve of the invention.

Referring to FIG. 1, a valve body 10 of the globe type includes an upstream inlet 11, a downstream outlet 12 and a pair of mounting flanges 13 and 14. Details of these portions of the valve body are unimportant to the invention and will not be elaborated upon. Suffice it to say that flanges 13 and 14 include a plurality of mounting holes for supporting the valve body in a pipeline with mating surfaces 15 and 16 in sealing engagement with mating surfaces in corresponding pipeline flanges (not shown). The valve body has a bonnet 17 secured thereto by a plurality of nuts 20 on studs 19. The studs pass through a corresponding plurality of holes 18 in the bonnet and are secured in the valve body by means of stud supports 21 which, as illustrated, may be simple threaded holes in the body. Here again it will be appreciated that any number of mounting techniques for removably affixing a bonnet to the valve body may be used, with the stud and nut approach merely being illustrative of one construction. Bonnet 17 is oriented at right angles to the valve flow axis and, as will be seen, permits removal of the regulator valve for servicing without removing the valve body from the pipeline.

Interposed between upstream inlet 11 and downstream outlet 12 is a baffle 23 including a frustroconical cage portion 24 defining a plurality of slots or flow apertures 25 therein. The edges of the slots are preferably rounded and otherwise free of sharp surfaces to enhance the life of a contacting, generally spherically shaped, diaphragm or liner 32. The liner in FIG. 1 is shown in the fully closed position with the slots 25 being fully covered by the liner to prevent fluid flow from the upstream inlet to the downstream outlet of the valve.

The bottom portion of baffle 23 rests in a circular recess 26 of the valve body and is sealed to the valve body by compression of an O-ring 27 situated between the rounded bottom portion of baffle 23 and the bottom and side wall of recess 26. A generally cylindrically shaped retainer 30 is positioned above and in contact with the upper peripheral edge of the frustroconical cage portion 24 and includes an outwardly protruding recessed annular lip 28 for captivating and sealing the peripheral edge of liner 32 therebetween, as illustrated. A gasket 29 is provided between a mating surface on the lower portion of bonnet 17 and a corresponding mating surface on the upper part of the valve body. When bonnet 17 is placed in position and nuts 20 tightened on studs 19, gasket 29, O-ring 27 and the peripheral edge of liner 32 are compressed to provide respective fluid tight seals. In the same manner, the upper, smaller diameter portion of retainer 30 includes an annular groove in which an O-ring 41 is positioned for providing an edge seal with the cylindrical wall of a circular recess 40 in bonnet 17. The provision of the above mentioned seals assures that there is no communication between the upstream inlet and the downstream outlet except by means of the rolling diaphragm and baffle slots.

A movable cone-shaped nose piece 34 is mounted for axial movement in a deep circular recess 39 in retainer 30 in confronting relationship with liner 32. It is affixed by any convenient means 35 to a shaft 36 and is spring loaded by a compression spring 38 for limited vertical axial movement with respect to retainer 30. Under the action of compression spring 38, nose 34 is urged downwardly toward the center of liner 32. A head 42 on shaft 36 limits the downward movement of nose 34 by contacting the top of retainer 30 which has a circular hole through which shaft 36 passes. As shown, head 42, shaft 36 and retainer means 35 may simply take the form of a shoulder bolt threadingly engaging nose piece 34. An orifice 31 in the top of retainer 30 enables pilot pressure from an inlet 55 to pass into a control chamber 33 in which the regulator valve is situated. The pilot pressure (indicated by a broken line arrow A) is communicated to the inner surface of liner 32 through a passage 37 in retainer 30.

An indicator shaft 44 contacts the top of head 42 on shaft 36 and extends through a cap 46 secured to the top of bonnet 17 by means of a threaded connection 46a or by any other suitable mounting arrangement. Cap 46 has an axially directed aperture 45 through which indicator shaft 44 protrudes. An O-ring 43 in a circular recess in the bottom of cap 46 provides a sealing engagement between the aperture wall and indicator shaft. A backing piece 47 is interposed between the bottom of cap 46 and a light compression spring 49 to provide a bias for maintaining the lower end of indicator shaft 44 in contact with head 42. A travel indicator 48 is affixed to the top of indicator shaft 44 and provides a convenient mechanism for visually indicating the amount that the regulator valve is open to flow. The travel indicator may be a simply stem, as shown, or may include a backup indicator plate, if desired.

A pilot control valve 50 is shown as a block in communication with an upstream pressure source 51, a downstream pressure line 52, a bleed line 53 and a pilot pressure line 54. By any conventional means (not illustrated) the upstream pressure in the flowpath is sampled and supplied to the pilot control valve 50 by means of pressure line 51, the downstream pressure in the flowpath is sampled and supplied to pilot valve 50 via downstream pressure line 52 and bleed pressure is supplied by bleed line 53 to a bleed inlet 56 which communicates with a bleed passage to the downstream outlet as indicated by a broken line arrow B. The pilot pressure line 54 is coupled to inlet 55 in bonnet 17 and, as illustrated by arrow A, communicates with control chamber 33 which opens to the interior of retainer 30 by means of orifice 31 and extends through a passageway 37 behind liner 32 and in front of nose piece 34. As is well known, the pilot control pressure controls the rolling movement of liner 32 and therefore its position against the slots 25 in frustroconical cage 24. As the pilot pressure is increased, the diaphragm is moved to cover a greater portion of each of the slots. In FIG. 1, the valve is in a closed position with liner 12 fully covering each of the slots 25.

Figure 2:
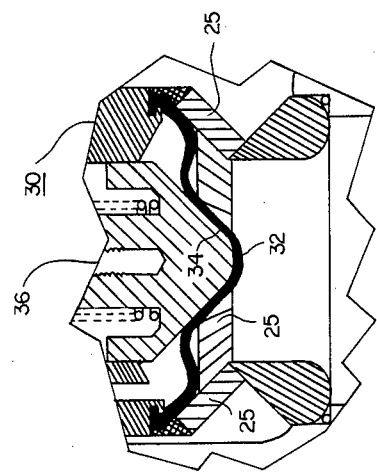
FIG. 2 is a portion of FIG. 1 showing the valve in a partially open position.

Reference to FIG. 2 shows the valve in a partially open position with a portion of liner 32 being rolled back against nose cone 34 and exposing portions of slots 25. The liner is moved to this position by a decrease in the pilot pressure in the face of upstream pressure on the other side of the liner and, as is clearly seen, forces nose cone 34 to move upwardly into retainer 30, causing shaft 36 to move indicator shaft 44 and travel indicator 48. Since nose cone 34 is contacted by the center of the liner almost immediately after the pilot pressure is decreased, liner movement is very closely controlled as it drapes over the surface of the nose cone and forces it to move. Thus, the prior art tendency of the liner to fold over or become pinched is eliminated with the invention.

Figure 3:
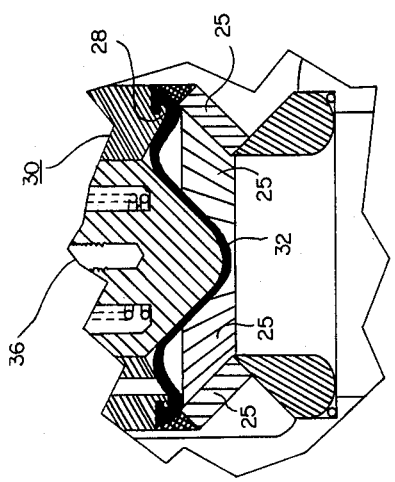
FIG. 3 is a similar view showing the valve in a fully open position.

In FIG. 3, the fully open position of the valve is illustrated with liner 32 being draped over substantially the full frontal surface of movable nose cone 34. In this position the full areas of the slots 25 are exposed to enable full flow from the upstream inlet to the downstream outlet through the baffle 23. It should be noted that the "arc length" of spherical liner 32, that is, the distance over the surface of the liner between diametrically opposed points on its peripheral lip, is equal to the distance between these points measured along the surface of retainer 30 and across nose cone 34. This dimensioning permits a strong fabric reinforced non-stretch liner to be used, whereas the liners of the prior art were made to stretch during closure. The stretchable liner contributed greatly to the tendency of the liner to fold over or become pinched. Since the liner of the invention is fabric-reinforced and non-stretchable, it must be capable of covering the full extent of the baffle apertures to insure tight closure. The fabric reinforcement also aids in minimizing extrusion of the liner into the apertures of the baffle.

It will also be appreciated by those skilled in the art that the spring loading of nose cone 34 assists in shut-off of the valve. As pilot pressure in the control chamber is increased for shut-off, spring 38 moves the nose cone to help drive the liner toward its closed position. Thus, nearly all movement of the liner occurs with at least a portion of the liner being draped over and supported by nose cone 34. Only at the final closure position illustrated in FIG. 1, does the liner leave contact with the nose cone. Thus, any tendency for pinching or foldover of the liner is drastically curtailed.

The inventive valve construction has thus been shown to have many advantageous characteristics. The globe valve type body arrangement enables ready servicing of the rolling diaphragm regulator valve by simply undoing the bonnet and removing the entire regulator valve for refurbishing, cleaning or the like. This feature is very important and eliminates the need to remove the line bolting and break into the pipeline. Further, the provision of a travel indicator that functions in response to movement of the nose cone provides a visual indication of the amount that the valve has been opened or closed. The non-stretchable liner of reinforced fabric eliminates the tendency for pinching and fold-over and is suitable for use in large temperature extremes and with many caustic solutions and gases. The reinforced fabric liner also resists extrusion into the baffle slots and, as a consequence, has an enhanced service life. While many materials may be used, the liner of the preferred embodiment includes a Dacron fabric embedded in a synthetic rubber.

What has been described in a novel rolling diaphragm regulator valve that solves many of the problems of the prior art. It is recognized that numerous modifications and changes in the described embodiment of the invention will be apparent to those skilled in the art without departing from its true spirit and scope. The invention is to be limited only as defined in the claims.

We claim:

1. A rolling diaphragm regulator valve comprising:
   a valve body having an upstream inlet and a downstream outlet;
   a control chamber in said valve body;
   a frustroconical baffle interposed between said inlet and said outlet and defining a plurality of apertures;
   a circular reinforced substantially non-stretchable diaphragm arranged for rolling and unrolling along said apertures responsive to a pilot pressure in said control chamber to progressively expose and cover said apertures and thereby control upstream to downstream flow;
   a nose cone mounted for limited movement in an axial direction only toward and away from said baffle, said nose cone being in communication with said control chamber; and
   said diaphragm progressively draping over the surface of said nose cone during unrolling from said apertures and being entirely out of contact with said nose cone when said apertures are fully covered.

2. The valve of claim 1 wherein said movable nose cone is spring loaded to exert a bias force urging the nose cone toward the diaphragm.

3. The valve of claim 2 further including indicator means operable by movement of the nose cone to indicate the operating condition of the valve.

4. The valve of claim 3 wherein said diaphragm is fabric reinforced and substantially non-stretchable.

5. The valve of claim 4 wherein the liner is generally hemispherical and includes a peripheral lip for securing it to the baffle, the diametrical peripheral length along the surface of the diaphragm being substantially equal to the distance along the surface between diametrically opposed points on said peripheral lip and across the nose cone, with the diaphragm in the fully open position.

6. The valve of claim 5 wherein said valve is housed in a body of globe type.

7. A rolling diaphragm regulator valve comprising:
   a valve body defining an inlet and an oulet in axial alignment for mounting in a pipeline;
   a baffle interposed in said body between said inlet and said outlet and including a frustroconical portion defining a plurality of apertures;
   a control chamber situated at right angles to said inlet and said outlet;
   a circular diaphragm arranged for rolling and unrolling along the surface of said frustroconical portion, responsive to pressure in said control chamber, for progressively exposing and covering said apertures to regulate flow between said inlet and said outlet;
   a nose cone movable only in an axial direction mounted in said control chamber behind said diaphragm for contacting the center of said diaphragm as it begins to unroll;
   spring means for urging said movable nose cone towards said diaphragm;
   indicator means operable by movement of said nose cone for visually displaying an indication of the position of the valve; and
   said diaphragm being fabric reinforced and non-stretchable, and said diaphragm being entirely out of contact with said nose cone when fully covering said apertures.

8. The valve of claim 7 wherein said plurality of apertures are slot shaped and wherein said diaphragm is hemispherical and includes a peripheral lip secured to said baffle.

9. The valve of claim 8 wherein said nose cone, said baffle and said diaphragm are removable without removing said valve body from said pipeline.

* * * * *